United States Patent
Bruce et al.

(10) Patent No.: US 11,512,644 B2
(45) Date of Patent: Nov. 29, 2022

(54) GAS TURBINE ENGINE

(71) Applicant: ROLLS-ROYCE plc, London (GB)

(72) Inventors: Graham P Bruce, Derby (GB);
Stephen M Husband, Derby (GB);
David F Brookes, Derby (GB)

(73) Assignee: ROLLS-ROYCE plc, London (GB)

( * ) Notice: Subject to any disclaimer, the term of this patent is extended or adjusted under 35 U.S.C. 154(b) by 28 days.

(21) Appl. No.: 17/369,332

(22) Filed: Jul. 7, 2021

(65) Prior Publication Data
US 2022/0049658 A1 Feb. 17, 2022

(30) Foreign Application Priority Data
Jul. 30, 2020 (GB) .................................... 2011841

(51) Int. Cl.
*F02C 7/268* (2006.01)

(52) U.S. Cl.
CPC .......... *F02C 7/268* (2013.01); *F05D 2260/85* (2013.01)

(58) Field of Classification Search
CPC ..................................................... F02C 7/268
See application file for complete search history.

(56) References Cited

U.S. PATENT DOCUMENTS

| | | | | |
|---|---|---|---|---|
| 5,694,765 | A * | 12/1997 | Hield | ............ F02C 3/113 60/39.163 |
| 2006/0042252 | A1 | 3/2006 | Derouineau | |
| 2006/0087123 | A1 | 4/2006 | Stout et al. | |
| 2007/0040383 | A1 * | 2/2007 | Mehl | ............ F02N 11/006 290/36 R |
| 2015/0330300 | A1 * | 11/2015 | Suciu | ............ F02K 3/06 416/169 R |

(Continued)

FOREIGN PATENT DOCUMENTS

| EP | 3643906 A1 | 4/2020 |
|---|---|---|
| WO | 95/02120 A1 | 1/1995 |

(Continued)

OTHER PUBLICATIONS

Dec. 16, 2020 Search Report issued in British Patent Application No. GB2011841.0.

(Continued)

*Primary Examiner* — Katheryn A Malatek
(74) *Attorney, Agent, or Firm* — Oliff PLC

(57) ABSTRACT

Gas turbine engines and methods of starting gas turbine engines, the gas turbine engine including: an electronic engine controller; one or more spools designated a starting spool for starting the engine, and has a required starting torque $\tau s$; a permanent magnet alternator mechanically coupled with the starting spool, the alternator, in a motor mode, provides a peak torque of $\tau a$, and, in a generator mode, generates electrical power for the electronic engine controller; and an electrical starter-generator mechanically coupled with the starting spool. The starter-generator in a motor mode, provides a peak torque of $\tau sg$, and, in a generator mode, generates electrical power for an external load. $\tau sg + \tau a \geq \tau s$ and $\tau sg$, $\tau a < \tau s$, and the electronic engine controller, during a start procedure, operates both the permanent magnet alternator and the starter-generator in a motor mode to drive the starting spool.

15 Claims, 7 Drawing Sheets

(56) References Cited

U.S. PATENT DOCUMENTS

2017/0234234 A1* 8/2017 Pech .................. F02N 11/0862
                                                    290/31
2018/0202310 A1* 7/2018 Suciu ..................... F02C 7/268

FOREIGN PATENT DOCUMENTS

WO      2007/146246  A2    12/2007
WO      2007/146246  A3    2/2008

OTHER PUBLICATIONS

Jan. 4, 2022 Extended European Search Report issued in Patent Application No. 21183331.4.

* cited by examiner

GAS TURBINE ENGINE

CROSS-REFERENCE TO RELATED APPLICATIONS

This specification is based upon and claims the benefit of priority from United Kingdom Patent Application No. 2011841.0, filed on 30 Jul. 2020, the entire contents of which are incorporated herein by reference.

TECHNICAL FIELD

This disclosure relates to electrical start arrangements for gas turbine engines.

BACKGROUND

In aerospace, the more electric engine (MEE) and more electric aircraft (MEA) concepts are seen as increasingly attractive paths to reducing fuel consumption. For example, one known aircraft configuration includes electric machines in its engines which are operable as both motors and generators. This facilitates both generation of electrical power during flight and starting of the engine, allowing removal of the air-turbine starter and attendant bleed air ducting. One engine configuration for this known aircraft includes such electric machines coupled to the high-pressure spool of a twin-spool turbofan. Another includes such electric machines coupled to the intermediate-pressure spool of a triple-spool turbofan.

A problem associated with this approach is found in terms of the torque-speed characteristic required for starting the engine. Typically, one spool of a gas turbine engine, such as the high-pressure spool, is designated the starting spool, and must be rotated at a sufficient rotational rate $\omega_s$ to deliver the requisite pressure rise across the compressor to initiate combustion. To achieve this, sufficient torque $\tau_s$ must be applied to the spool. The value of both $\omega_s$ and $\tau_s$ differ substantially from the torque-speed requirements during mission phases when power is being generated—$\omega_s$ tends to be lower than the spool rotational speed at idle and above, and $\tau_s$ tends to be greater than the spool torque required to generate the required levels of electrical power. In turn, this leads to electric machine designs which, when considering the generation mode of operation, are oversized and thus heavier than required.

SUMMARY

In an aspect, there is provided a gas turbine engine comprising:
an electronic engine controller;
one or more spools, one of which is designated a starting spool for starting the engine, and which has a required starting torque $\tau_s$;
a permanent magnet alternator mechanically coupled with the starting spool, the alternator being configured to, in a motor mode, provide a peak torque of $\tau_a$, and, in a generator mode, generate electrical power for the electronic engine controller;
an electrical starter-generator mechanically coupled with the starting spool, the starter-generator being configured to, in a motor mode, provide a peak torque of $\tau_{sg}$, and, in a generator mode, generate electrical power for an external load;
wherein $\tau_{sg}+\tau_a \geq \tau_s$ and $\tau_{sg}$, $\tau_a < \tau_s$, and the electronic engine controller is configured to, during a start procedure, operate both the permanent magnet alternator and the starter-generator in a motor mode to drive the starting spool.

In an embodiment, the one or more spools comprises:
a high-pressure spool having a high-pressure compressor driven by a high-pressure turbine; and
a low-pressure spool having a low-pressure compressor driven by a low-pressure turbine.

In an embodiment, the high-pressure spool is designated as the starting spool.

In an embodiment, the low-pressure spool further comprises a fan driven by the low-pressure turbine.

In an embodiment, the fan is driven by the low-pressure turbine via a reduction gearbox.

In an embodiment, the one or more spools comprises:
a high-pressure spool having a high-pressure compressor driven by a high-pressure turbine; and
an intermediate-pressure spool having an intermediate-pressure compressor driven by an intermediate-pressure turbine.
a low-pressure spool having a fan driven by a low-pressure turbine;

In an embodiment, the high-pressure spool is designated as the starting spool.

In an embodiment, the intermediate-pressure spool is designated as the starting spool.

In an embodiment, the electrical starter-generator is one of:
a wound-field synchronous electric machine;
a permanent magnet synchronous electric machine.

In an embodiment, the permanent magnet alternator comprises a plurality of stator winding sets.

In another aspect there is provided a method of starting a gas turbine engine of the type comprising:
one or more spools, one of which is designated a starting spool for starting the engine, and which has a required starting torque $\tau_s$;
a permanent magnet alternator mechanically coupled with the starting spool, the alternator being configured to, in a motor mode, provide a peak torque of $\tau_a$, and, in a generator mode, generate electrical power for the electronic engine controller;
an electrical starter-generator mechanically coupled with the starting spool, the starter-generator being configured to, in a motor mode, provide a peak torque of $\tau_{sg}$, and, in a generator mode, generate electrical power for an external load;
wherein $\tau_{sg}+\tau_a \geq \tau_s$ and $\tau_{sg}$, $\tau_a < \tau_s$;
said method comprising operating both the permanent magnet alternator and the starter-generator in a motor mode to drive the starting spool.

In an embodiment, the one or more spools comprises:
a high-pressure spool having a high-pressure compressor driven by a high-pressure turbine; and
a low-pressure spool having a low-pressure compressor driven by a low-pressure turbine.

In an embodiment, the high-pressure spool is designated as the starting spool.

In an embodiment, the low-pressure spool further comprises a fan driven by the low-pressure turbine.

In an embodiment, the electrical starter-generator is one of:
a wound-field synchronous electric machine;
a permanent magnet synchronous electric machine.

BRIEF DESCRIPTION OF THE DRAWINGS

Embodiments will now be described by way of example only with reference to the accompanying drawings, and in which.

DETAILED DESCRIPTION

FIG. 1

Figure 1:
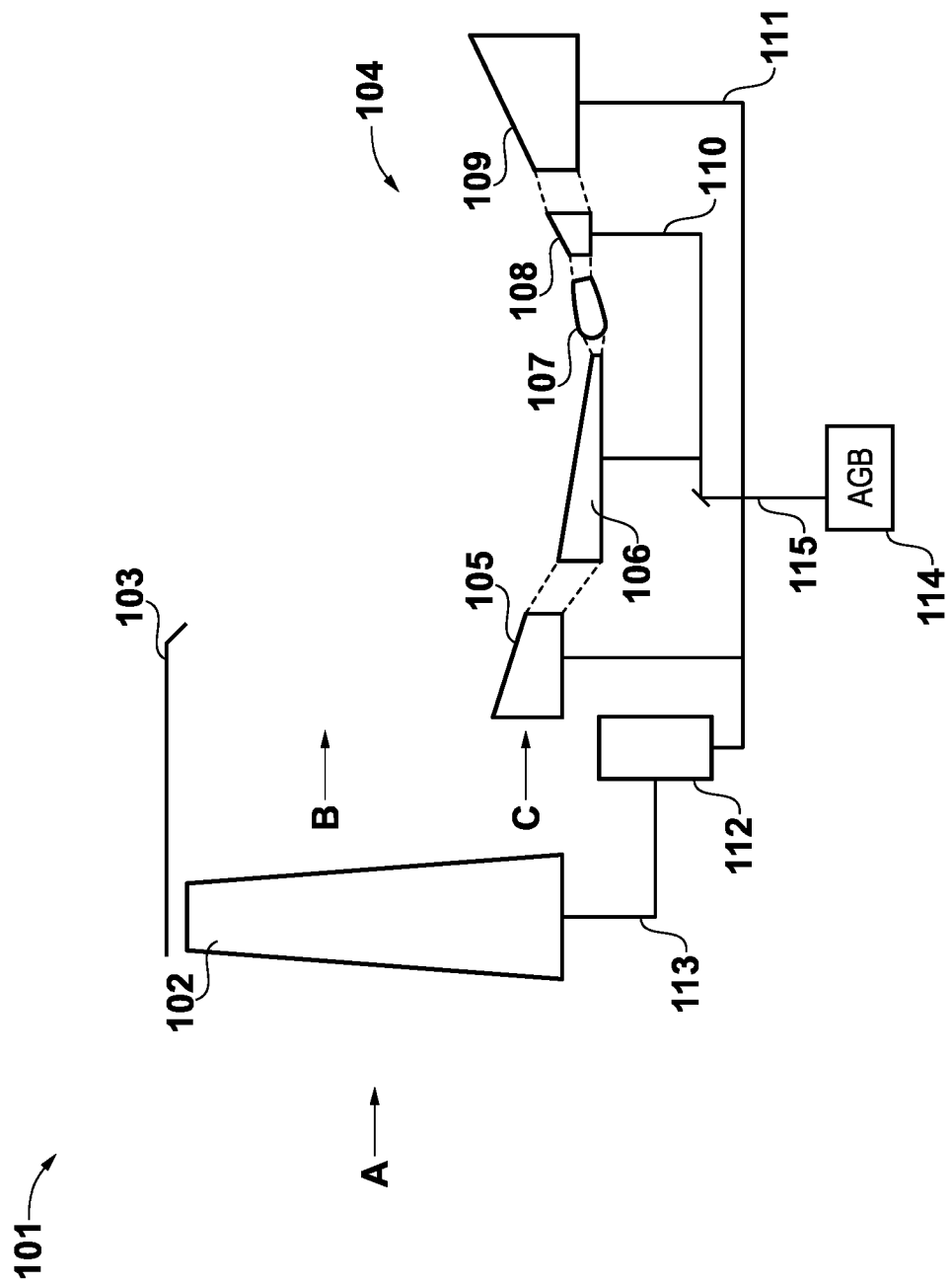
FIG. 1 shows a first embodiment of a turbofan engine.

A block diagram illustrating an engine 101 for an aircraft is shown in FIG. 1. In the present embodiment, the engine 101 is of turbofan configuration, and thus comprises a ducted fan 102 that receives intake air A and generates two pressurised airflows: a bypass flow B which passes axially through a bypass duct 103 and a core flow C which enters a core gas turbine 104.

The core gas turbine 104 comprises, in axial flow series, a low-pressure compressor 105, a high-pressure compressor 106, a combustor 107, a high-pressure turbine 108, and a low-pressure turbine 109.

In operation, the core flow C is compressed by the low-pressure compressor 105 and is then directed into the high-pressure compressor 106 where further compression takes place. The compressed air exhausted from the high-pressure compressor 106 is directed into the combustor 107 where it is mixed with fuel and the mixture is combusted. The resultant hot combustion products then expand through, and thereby drive, the high-pressure turbine 108 and thereafter the low-pressure turbine 109 before being exhausted through a core nozzle (not shown) to provide a proportion of the overall thrust.

The high-pressure turbine 108 drives the high-pressure compressor 106 via an interconnecting shaft 110. The low-pressure turbine 109 drives the low-pressure compressor 105 via another interconnecting shaft 111. Together, the high-pressure compressor 106, high-pressure turbine 108, and associated interconnecting shaft 110 form a high-pressure spool of the engine 101. Similarly, the low-pressure compressor 105, low-pressure turbine 109, and associated interconnecting shaft 111 form a low-pressure spool of the engine 101. Such nomenclature will be familiar to those skilled in the art.

In the present embodiment, the engine 101 is a geared turbofan, whereby the fan 102 is driven by the low-pressure turbine 109 via a reduction gearbox 112. In the present embodiment, the reduction gearbox 112 is an epicyclic gearbox. In the particular configuration illustrated in FIG. 1, the epicyclic gearbox is a planetary-configuration epicyclic gearbox. Thus, the low-pressure turbine 109 is connected with a sun gear of the gearbox 112, which is meshed with a plurality of planet gears located in a rotating carrier, which planet gears are in turn are meshed with a static ring gear. The rotating carrier drives the fan 102 via an output shaft 113.

It will be appreciated that in alternative embodiments a star-configuration epicyclic gearbox (in which the planet carrier is static and the ring gear rotates and provides the output) may be used instead. Furthermore, different reduction gearbox configurations could also be used, such as step-aside, layshaft, etc.

Engine accessories are driven, in this embodiment, by an accessory gearbox (AGB) 114. In the present embodiment, the accessory gearbox 114 is driven by the high-pressure spool. In this specific embodiment, the accessory gearbox 114 is driven via a tower shaft arrangement 115 of known configuration. The engine accessories include, in the present example, a fuel pump, a permanent magnet alternator (PMA), and an electrical starter-generator (ESG). The configuration and operation of these accessories will be described further with reference to FIG. 2. Other accessories may be provided depending on the chosen configuration of the engine; for example, a hydraulic pump may also be driven via the accessory gearbox. In alternative embodiments, the permanent magnet alternator and electrical starter-generator may be directly connected with the high-pressure spool in an embedded configuration.

Various embodiments of the engine 101 may include one or more of the following features.

It will be appreciated that instead of being a turbofan having a ducted fan arrangement, the engine 101 may instead be a turboprop comprising a propeller for producing thrust.

The low- and high-pressure compressors 105 and 106 may comprise any number of stages, for example multiple stages. Each stage may comprise a row of rotor blades and a row of stator vanes, which may be variable stator vanes (in that their angle of incidence may be variable). In addition to, or in place of, axial stages, the low- or high-pressure compressors 105 and 106 may comprise centrifugal compression stages.

The low- and high-pressure turbines 108 and 109 may also comprise any number of stages.

The fan 102 may have any desired number of fan blades, for example 16, 18, 20, or 22 fan blades.

Each fan blade may be defined as having a radial span extending from a root (or hub) at a radially inner gas-washed location, or 0 percent span position, to a tip at a 100 percent span position. The ratio of the radius of the fan blade at the hub to the radius of the fan blade at the tip—the hub-tip ratio—may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The hub-tip ratio may be in an inclusive range bounded by any two of the aforesaid values (i.e. the values may form upper or lower bounds). The hub-tip ratio may both be measured at the leading edge (or axially forwardmost) part of the blade. The hub-tip ratio refers, of course, to the gas-washed portion of the fan blade, i.e. the portion radially outside any platform.

The radius of the fan 102 may be measured between the engine centreline and the tip of a fan blade at its leading edge. The fan diameter may be greater than (or on the order of) any of: 2.5 metres, 2.6 metres, 2.7 metres, 2.8 metres, 2.9 metres, 3 metres, 3.1 metres, 3.2 metres, 3.3 metres, 3.4 metres, 3.5 metres, 3.6 metres, 3.7 metres, 3.8 metres or 3.9 metres. The fan diameter may be in an inclusive range bounded by any two of the aforesaid values (i.e. the values may form upper or lower bounds).

The rotational speed of the fan 102 may vary in use. Generally, the rotational speed is lower for fans with a higher diameter. Purely by way of non-limitative example, the rotational speed of the fan at cruise conditions may be less than 2500 rpm, for example 2300 rpm. Purely by way of further non-limitative example, the rotational speed of the fan 102 at cruise conditions for an engine having a fan diameter in the range of from 2.5 metres to 3 metres (for example 2.5 metres to 2.8 metres) may be in the range of from 1700 rpm to 2500 rpm, for example in the range of from 1800 rpm to 2300 rpm, or, for example in the range of from 1900 rpm to 2100 rpm. Purely by way of further non-limitative example, the rotational speed of the fan at cruise conditions for an engine having a fan diameter in the range of from 3.2 metres to 3.8 metres may be in the range of from 1200 rpm to 2000 rpm, for example in the range of from 1300 rpm to 1800 rpm, for example in the range of from 1400 rpm to 1600 rpm.

In use of the engine 101, the fan 102 (with its associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the one-dimensional average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds).

The engine 101 may have any desired bypass ratio, where the bypass ratio is defined as the ratio of the mass flow rate of the flow B through the bypass duct to the mass flow rate of the flow C through the core at cruise conditions. Depending upon the selected configuration, the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the aforesaid values (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of the engine 101 may be defined as the ratio of the stagnation pressure upstream of the fan 102 to the stagnation pressure at the exit of the high-pressure compressor 106 (before entry into the combustor). By way of non-limitative example, the overall pressure ratio of the engine 101 at cruise may be greater than (or on the order of) any of the following: 35, 40, 45, 50, 55, 60, 65, 70, 75. The overall pressure ratio may be in an inclusive range bounded by any two of the aforesaid values (i.e. the values may form upper or lower bounds).

Specific thrust of the engine 101 may be defined as the net thrust of the engine divided by the total mass flow through the engine 101. At cruise conditions, the specific thrust of the engine 101 may be less than (or on the order of) any of the following: 110 Nkg$^{-1}$s, 105 Nkg$^{-1}$s, 100 Nkg$^{-1}$s, 95 Nkg$^{-1}$s, 90 Nkg$^{-1}$s, 85 Nkg$^{-1}$s, or 80 Nkg$^{-1}$s. The specific thrust may be in an inclusive range bounded by any two of the values in the previous sentence (i.e. the values may form upper or lower bounds). Such engines may be particularly efficient in comparison with conventional gas turbine engines.

The engine 101 may have any desired maximum thrust. For example, the engine 101 may be capable of producing a maximum thrust of at least (or on the order of) any of the following: 160 kilonewtons, 170 kilonewtons, 180 kilonewtons, 190 kilonewtons, 200 kilonewtons, 250 kilonewtons, 300 kilonewtons, 350 kilonewtons, 400 kilonewtons, 450 kilonewtons, 500 kilonewtons, or 550 kilonewtons. The maximum thrust may be in an inclusive range bounded by any two of the aforesaid values (i.e. the values may form upper or lower bounds). The thrust referred to above may be the maximum net thrust at standard atmospheric conditions at sea level plus 15 degrees Celsius (ambient pressure 101.3 kilopascals, temperature 30 degrees Celsius), with the engine 101 being static.

In use, the temperature of the flow at the entry to the high-pressure turbine 108 may be particularly high. This temperature, which may be referred to as turbine entry temperature or TET, may be measured at the exit to the combustor 107, for example immediately upstream of the first turbine vane, which itself may be referred to as a nozzle guide vane. At cruise, the TET may be at least (or on the order of) any of the following: 1400 kelvin, 1450 kelvin, 1500 kelvin, 1550 kelvin, 1600 kelvin or 1650 kelvin. The TET at cruise may be in an inclusive range bounded by any two of the aforesaid values (i.e. the values may form upper or lower bounds). The maximum TET in use of the engine 101 may be, for example, at least (or on the order of) any of the following: 1700 kelvin, 1750 kelvin, 1800 kelvin, 1850 kelvin, 1900 kelvin, 1950 kelvin or 2000 kelvin. The maximum TET may be in an inclusive range bounded by any two of the aforesaid values (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium-based body with a titanium leading edge.

The fan 102 may comprise a central hub portion, from which the fan blades may extend, for example in a radial direction. The fan blades may be attached to the central portion in any desired manner. For example, each fan blade may comprise a fixture which may engage a corresponding slot in the hub. Purely by way of example, such a fixture may be in the form of a dovetail that may slot into and/or engage a corresponding slot in the hub/disc in order to fix the fan blade to the hub. By way of further example, the fan blades maybe formed integrally with a central hub portion. Such an arrangement may be a bladed disc or a bladed ring. Any suitable method may be used to manufacture such a bladed disc or bladed ring. For example, at least a part of the fan blades may be machined from a billet and/or at least part of the fan blades may be attached to the hub/disc by welding, such as linear friction welding.

The engine 101 may be provided with a variable area nozzle (VAN). Such a variable area nozzle may allow the exit area of the bypass duct to be varied in use. The general principles of the present disclosure may apply to engines with or without a VAN.

As used herein, cruise conditions have the conventional meaning and would be readily understood by those skilled in the art.

Such cruise conditions may be conventionally defined as the conditions at mid-cruise, for example the conditions experienced by the aircraft and/or engine at the midpoint (in terms of time and/or distance) between top of climb and start of descent. Cruise conditions thus define an operating point of the gas turbine engine which provides a thrust that would ensure steady state operation (i.e. maintaining a constant altitude and constant Mach number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach number are known, and thus the operating point of the engine at cruise conditions is clearly defined.

The cruise conditions may correspond to ISA standard atmospheric conditions at an altitude that is in the range of from 10000 to 15000 metres, such as from 10000 to 12000 metres, or from 10400 to 11600 metres (around 38000 feet), or from 10500 to 11500 metres, or from 10600 to 11400 metres, or from 10700 metres (around 35000 feet) to 11300 metres, or from 10800 to 11200 metres, or from 10900 to 11100 metres, or 11000 metres. The cruise conditions may correspond to standard atmospheric conditions at any given altitude in these ranges.

The forward speed at the cruise condition may be any point in the range of from Mach 0.7 to 0.9, for example one of Mach 0.75 to 0.85, Mach 0.76 to 0.84, Mach 0.77 to 0.83, Mach 0.78 to 0.82, Mach 0.79 to 0.81, Mach 0.8, Mach 0.85, or in the range of from Mach 0.8 to 0.85. Any single speed within these ranges may be the cruise condition. For some aircraft, the cruise conditions may be outside these ranges, for example below Mach 0.7 or above Mach 0.9.

Thus, for example, the cruise conditions may correspond specifically to a pressure of 23 kilopascals, a temperature of minus 55 degrees Celsius, and a forward Mach number of 0.8.

It will of course be appreciated, however, that the principles of the invention claimed herein may still be applied to engines having suitable design features falling outside of the aforesaid parameter ranges.

FIG. 2

Figure 2:
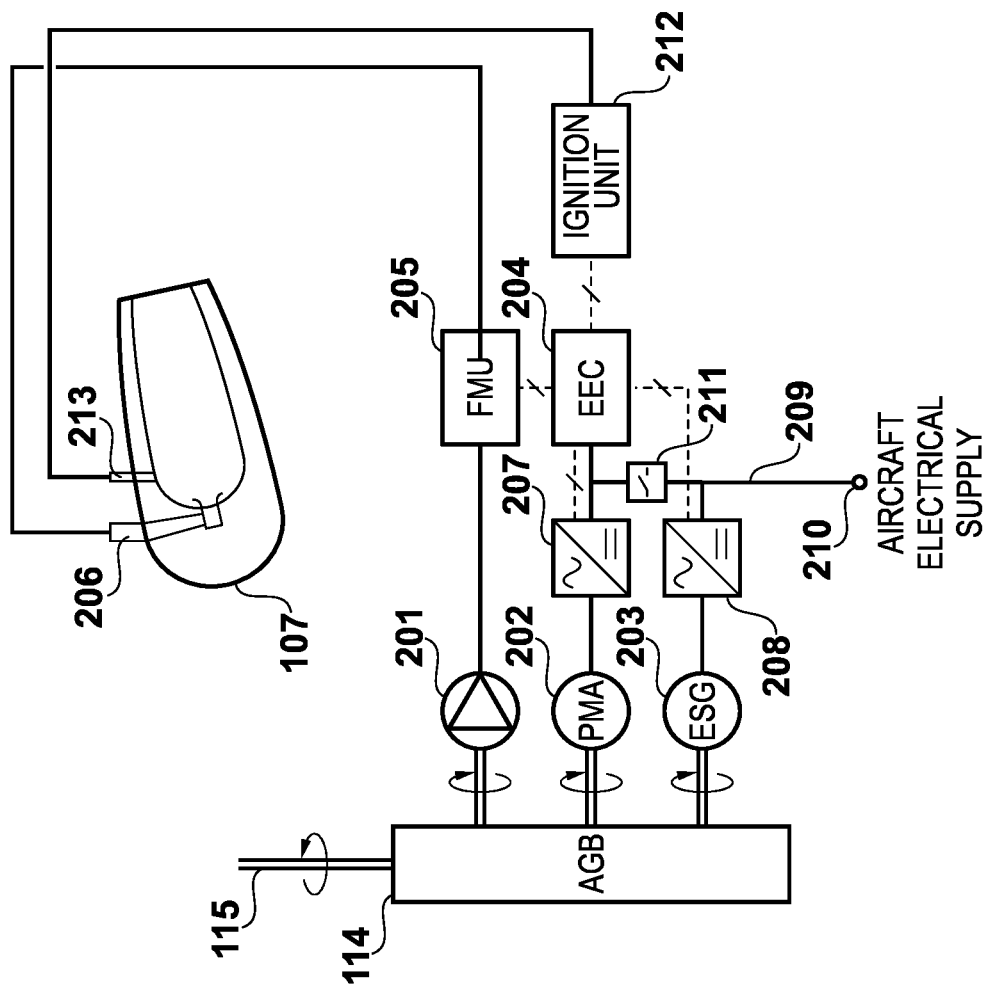
FIG. 2 shows the configuration of the start arrangement for the engine of FIG. 1.

The arrangement of engine accessories is shown in FIG. 2.

As described previously, in the present embodiment the accessory gearbox 114 is mechanically coupled to and drives a fuel pump 201, a permanent magnet alternator 202, and an electrical starter-generator 203. As electrical starter-generator 203 is mechanically coupled with the high-pressure spool of the engine 101 via, in this embodiment, the accessory gearbox 114 and tower shaft arrangement 115, the high-pressure spool is designated the starting spool for the engine 101.

In an embodiment, the permanent magnet alternator 202 comprises a plurality of stator winding sets for the purposes of redundancy. In a specific embodiment, each winding set comprises three phases connected in a star arrangement. A delta connection could be used instead depending on, for example, the grounding scheme etc. A different number of phases could be provided depending upon, for example, the size of the alternator. In a specific embodiment, four winding sets are provided to meet the requisite degree of redundancy.

In an embodiment, the electrical starter-generator 203 is a wound-field electric machine, having a wound rotor whose field is generated by an exciter. Such machine types are currently used in service as electrical starter-generators. In another embodiment, the electrical starter-generator 203 is a permanent magnet electric machine, having a permanent magnet rotor to improve power density.

Control of the operation of the engine 101 is performed by an electronic engine controller (EEC) 204. Data interfaces facilitating control of engine components are represented as dashed lines in the Figure. In the present embodiment the EEC 204 is a full-authority digital engine controller (FADEC), the configuration of which will be known and understood by those skilled in the art. It therefore controls all aspects of the engine 101. Control of fuel metering is achieved by provision of a fuel metering unit (FMU) 205 of known configuration. The fuel metering unit 205 supplies fuel to fuel injectors 206 in the combustor 107.

Conversion from alternating current (ac) produced by the permanent magnet alternator 202 into direct current (dc) is performed by a bidirectional power control unit (PCU) 207. Conversion from alternating current produced by the electrical starter-generator 203 into direct current is performed by a bidirectional power converter 208. Provision of bidirectional power conversion apparatus allows the starting spool to be driven electrically during a start procedure.

In the present embodiment, the dc sides of the power control unit 207 and the bidirectional power converter 208 interface with a dc bus 209. The dc bus 209 supplies power for operation of the electronic engine controller 204. The dc bus 209 may also supply power for other electrical loads on the engine (not shown). In the present example, the dc bus 209 comprises an aircraft interface 210 for connection with an aircraft electrical supply. This enables the dc bus 209 to deliver power to an aircraft on which the engine 101 is installed, and similarly receive power from aircraft-side energy storage such as batteries, or other power sources such as an auxiliary power unit (APU) or another engine. It will be appreciated that the dc bus 209 could instead be an ac bus, either operating at fixed or variable frequency, with additional power conversion apparatus provided to provide voltage conversion, frequency conversion, etc.

In order to facilitate isolation of the permanent magnet alternator 202, power control unit 207, and electronic engine controller 204 from the electrical starter-generator 203 and aircraft interface 210 following engine start, a switch 211 is provided between the connection of the power control unit 207 and electronic engine controller 204 to the bus 209, and the connection of the bidirectional power converter 208 to the bus 209. In this way, both the power control unit 207 and the bidirectional power converter 208 may receive power via the aircraft interface 210 during engine start with the switch 211 closed, following which the switch 211 may be opened to isolate the power control unit 207 and electronic engine controller 204 from the aircraft interface 210. In a specific embodiment, the switch 211 are dc contactors, which as will be familiar to those skilled in the art are electrically-controlled switches used for switching an electrical power circuit, where the control circuit has a lower power level than the switched circuit.

In order to initiate combustion of fuel in the combustor 107 during a start procedure, an ignition unit 212 of known configuration is provided which operates under control of the electronic engine controller 204. The ignition unit 212 operates igniters 213 in the combustor 107 for initiating the combustion process.

FIGS. 3A & 3B

In order to start the engine 101, the starting spool must be rotated at a minimum speed to deliver sufficient mass flow to the combustor 107.

Figure 3A:
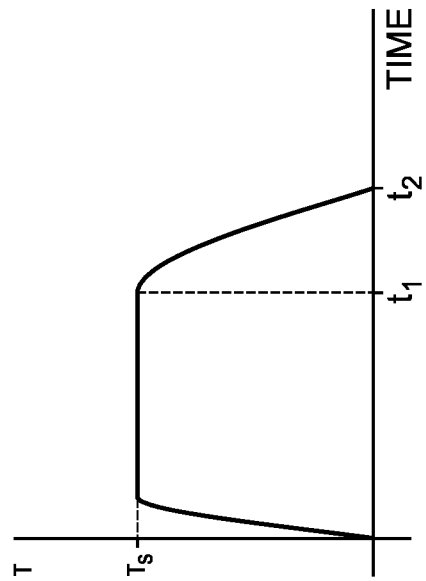
FIGS. 3A and 3B are, respectively, plots of start spool rotational speed against time, and start spool torque against time.

A plot of the rotational speed $\omega$ of the high-pressure spool with respect to time during the starting process is shown in FIG. 3A. Initially, the rotational speed $\omega$ is increased to a speed $\omega_1$. After the airflow has stabilised and any remnant fuel from the previous cycle is purged from the flowpath, the electronic engine controller 204 begins the ignition process at time $t_1$. In particular, the fuel metering unit 205 begins to deliver fuel by the injectors 206, and the ignition unit 212 energises the igniters 213. With the combustion process initiated, the rotational speed $\omega$ increases again until an idle speed $\omega_2$ is reached at $t_2$, whereupon the ignition unit 212 may be disabled.

Figure 3B:
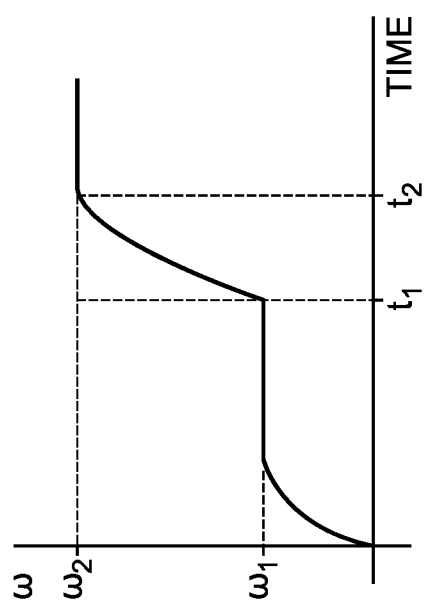

A plot of the external torque $\tau$ required to drive the high-pressure spool during the starting process is shown in FIG. 3B. Initially, a starting torque $\tau_s$ must be applied until time $t_1$ whereupon the products of the combustion process begin to drive the high-pressure turbine 110. As the non-dimensional flow (a function of mass flow, temperature and pressure) through the high-pressure turbine 110 begins to increase, so too does the torque it produces. Thus, the required external torque from time $t_1$ to $t_2$ decreases.

FIGS. 4A & 4B

As described in the introduction, many prior art engines provided the external torque required for starting, $\tau_s$, by means of an air turbine starter. A small number of engine types provide the starting torque an electrical starter-generator.

Figure 4A:
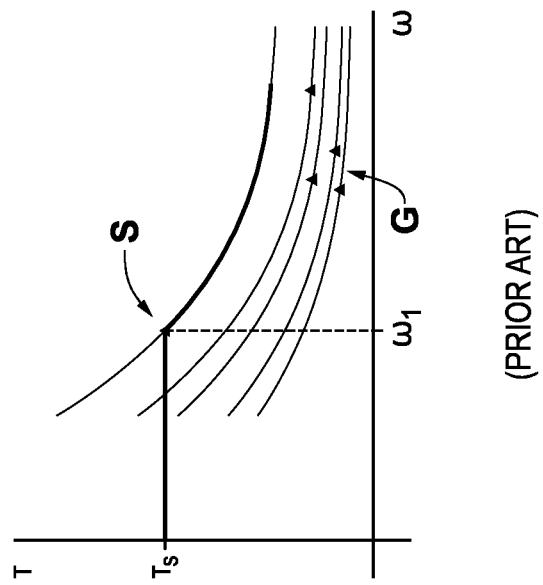
FIGS. 4A and 4B are plots of the torque-speed characteristics of a prior art electrical starter-generator.

A torque-speed characteristic for a prior art electrical starter-generator is shown in FIG. 4A. Operating points of the engine are shown on the plot with starting point S being the combination of torque and speed required to start the engine, and generating points G being the combination of torque and speed required to generate various levels of power during operation. Lines of constant power are also shown on the chart for the various points S, G. In this example, the electrical starter-generator is designed for operation in constant-torque mode, and thus is capable of delivering full rated torque $\tau_s$ over the full range of speeds w. It will be noted, therefore, that the torque-speed capability of the electrical starter-generator far exceeds that required by the generating points G.

Figure 4B:
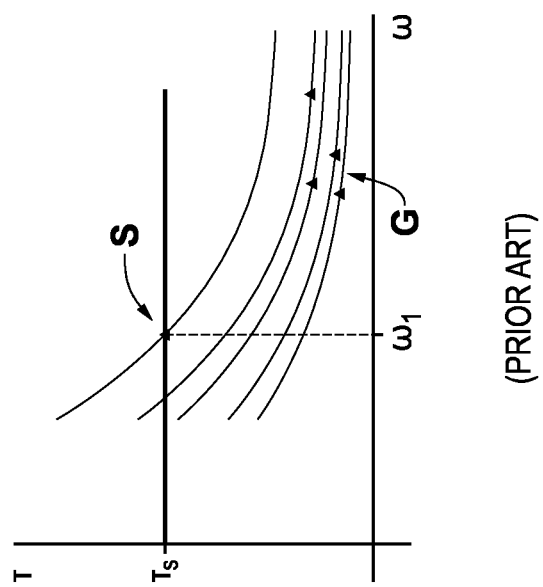

As shown in FIG. 4B, field weakening control may be used to operate a prior art electrical starter-generator in a constant-power mode for the generating points G. This allows a reduction in size of the starter-generator as the peak torque-speed value is now the starting point S. However, even the constant-power line which passes through starting point S substantially exceeds the generating point G with the highest power demand, resulting in an electrical starter-generator which is over-specified for the generating points G. It should be noted that field weakening operates by reducing the field to in turn reduce back-emf, allowing a larger current to flow in the armature. In permanent magnet drives in particular, failure of the power electronic converter implementing the field-weakening control results in the restoration of the full field, and thus a significant overvoltage condition. This can be detrimental to the safety of the entire electrical system.

It will therefore be appreciated from FIGS. 4A and 4B that no matter the control scheme for the motor, it is the starting point S which sizes this prior art electrical starter-generator in terms of its design parameters. Most notably, for a fixed machine type and technology level, the volume of the electrical starter-generator and its weight will be determined by this starting point S. It will therefore be appreciated that the asymmetry in terms of the torque-speed combination required for starting the engine results in a larger and heavier design than if it was only designed for generating power during flight.

FIGS. 5A & 5B

Thus in engine 101, the permanent magnet alternator is also operated during the starting process. A permanent magnet alternator may be a mandated safety requirement and may therefore be required to be present, and indeed said safety requirements may preclude its function being replaced by the electrical starter-generator.

Figure 5A:
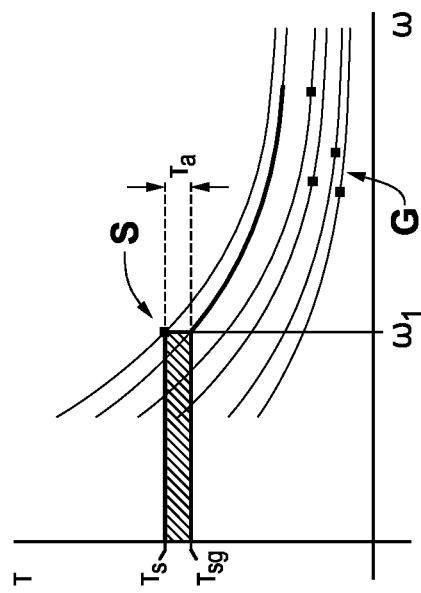
FIGS. 5A and 5B are plots of the torque-speed characteristics of the electrical starter-generator of FIG. 2.

A plot of the torque-speed characteristic of the electrical starter-generator 203 is shown in FIG. 5A. In this embodiment, the electrical starter-generator 203 is adapted to operate in a constant-torque mode of operation. As shown in the plot, the peak torque $\tau_{sg}$ of the electrical starter-generator 203 is less than the torque $\tau_s$ for rotating the high-pressure spool. This shortfall, shown in the hatched region 411, is made up in the present embodiment by the peak torque capability of the permanent magnet alternator 402, $\tau_a$. Thus, whilst both $\tau_{sg}$ and $\tau_a$ are less than $\tau_s$, the combination of $\tau_{sg}$ and $\tau_a$ is greater than $\tau_s$. As can be seen, however, the electrical starter-generator 203 is still capable of operating at its required generating points 412. In this way, the asymmetry in terms of specification between the starter and the generator modes of operation is reduced.

Figure 5B:
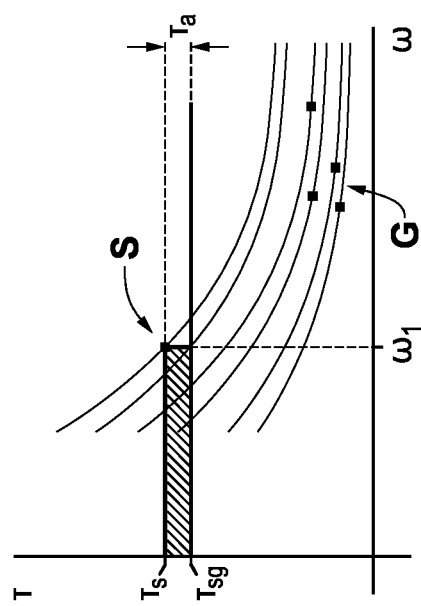

Another plot of the torque-speed characteristic of the electrical starter-generator 203 is shown in FIG. 5B. In this embodiment, the electrical starter-generator 203 and bidirectional power converter 208 are configured to implement field weakening to operate in a constant-power mode above speed $\omega_1$. It will be seen from this plot that the constant-power line of the electrical starter-generator 203 is appreciably lower than that of the prior art electrical starter-generator shown in FIG. 4B. As described previously, the use (or not) of field weakening to facilitate a reduction in size of the electric machine may be determined by, for example, the selected level of integrity and redundancy in the bidirectional power converter 208 which implements the field weakening.

In an example, $\tau_s$ was 250 Nm and $\omega_1$ is 5000 rpm. The peak generating point 402/412 was 100 Nm at 15000 rpm. Utilising the prior art configuration, the weight of an electrical starter-generator meeting these requirements was 38 kg. By utilising the combination of the permanent magnet alternator 202 and the electrical starter-generator 203, it was possible to meet the $\tau_s$ requirement with an electrical starter-generator torque $\tau_{sg}$ of 230 Nm and a permanent magnet alternator torque of 20 Nm at $\omega_1$. This resulted in a reduction in the weight of the electrical starter-generator of 3 kg.

FIG. 6

Figure 6:
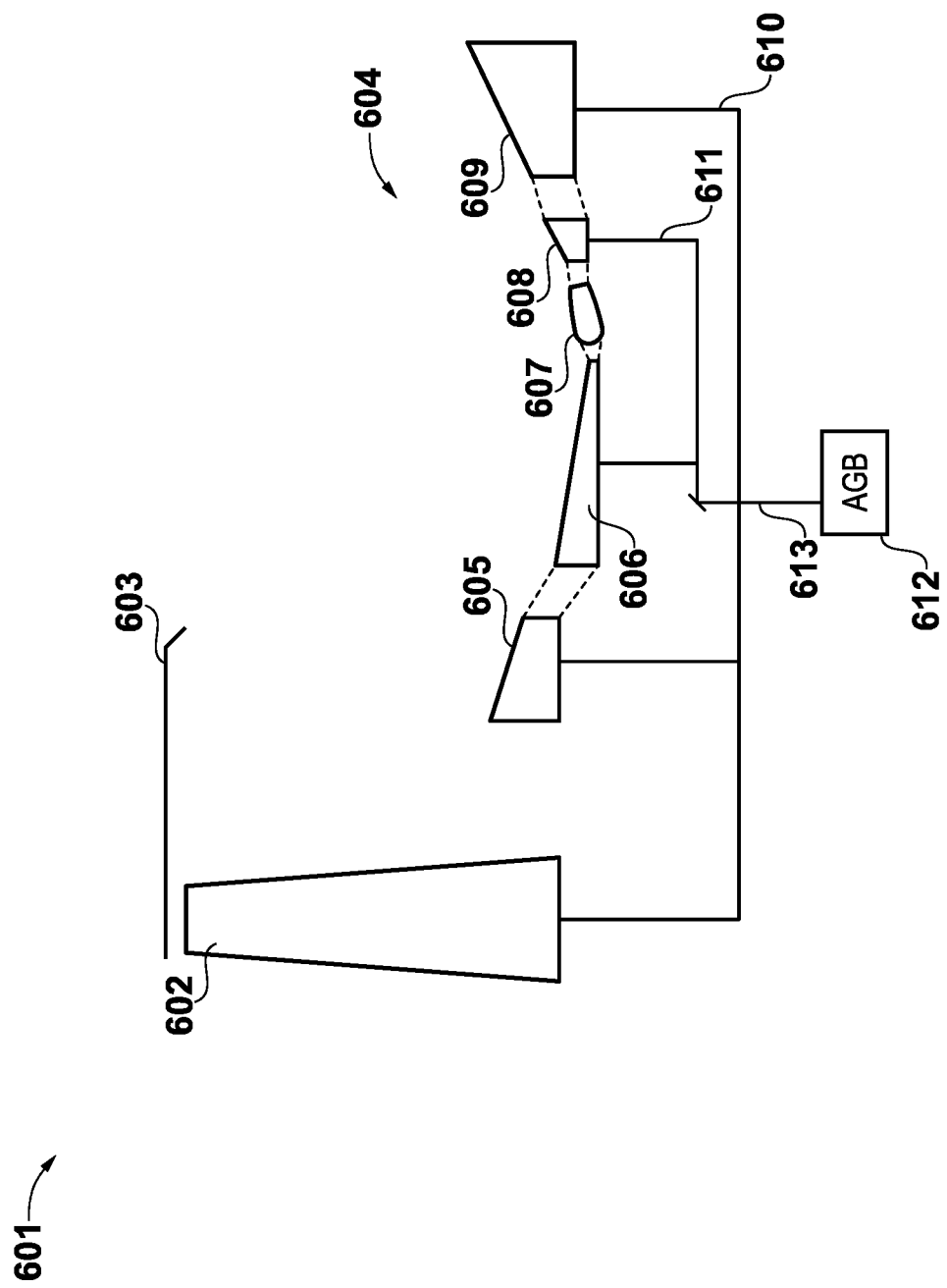
FIG. 6 shows an alternative turbofan engine.

A two-shaft configuration turbofan engine 601 is shown in block diagram form in FIG. 6. The engine 601 comprises a fan 602 located in a duct 603, which fan is driven by a core gas turbine 604. The core gas turbine 604 comprises, in axial flow series, a low-pressure compressor 605, a high-pressure compressor 606, a combustor 607, a high-pressure turbine 608, and a low-pressure turbine 609.

The low-pressure compressor 605 is driven by the low-pressure turbine 609 via an interconnecting shaft 610. In this configuration, no reduction gearbox is used and the fan 602 is driven directly by the low-pressure turbine 609. Together, the fan 602, the low-pressure compressor 605, the low-pressure turbine 609 and interconnecting shaft 610 form the low-pressure spool. The high-pressure compressor 606 is driven by the high-pressure turbine 608 via an interconnecting shaft 611, together forming a high-pressure spool. In this configuration, the high-pressure spool is designated as the starting spool.

The same approach for starting engine 101 may be taken with the engine 601, with the combination of permanent magnet alternator and electrical starter-generator being used together to drive the starting spool via the accessory gearbox 612 and tower shaft arrangement 613 during the engine start procedure.

FIG. 7

Figure 7:
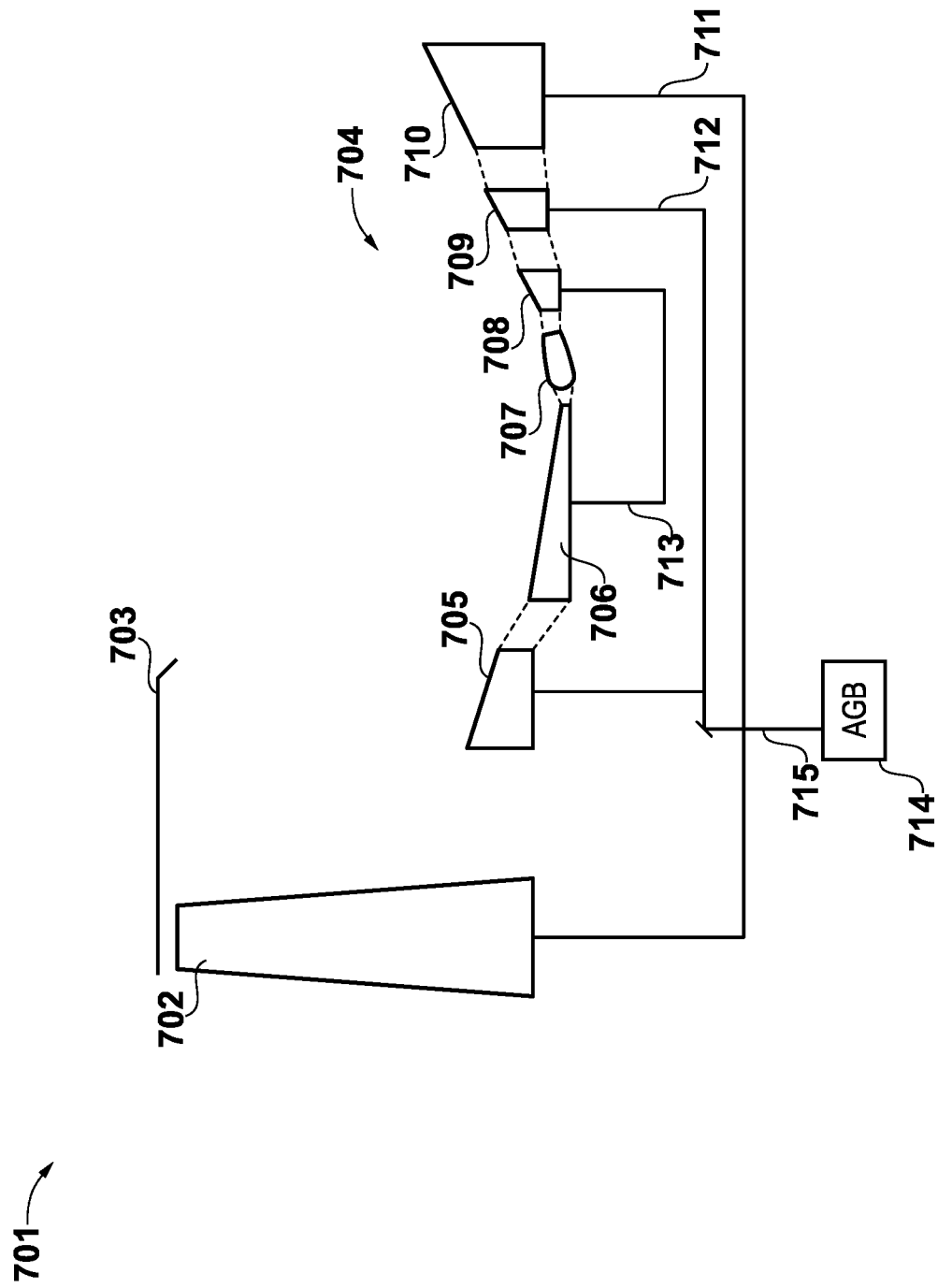
FIG. 7 shows another alternative turbofan engine.

A three-shaft configuration turbofan engine 701 is shown in block diagram form in FIG. 7. The engine 701 comprises a fan 702 located in a duct 703, which fan is driven by a core gas turbine 704. The core gas turbine 704 comprises, in axial flow series, an intermediate-pressure compressor 705, a high-pressure compressor 706, a combustor 707, a high-pressure turbine 708, an intermediate-pressure turbine 709, and a low-pressure turbine 710.

The fan 702 is driven directly by the low-pressure turbine 710 via an interconnecting shaft 711. Together, the fan 702, the low-pressure turbine 710 and interconnecting shaft 711 form the low-pressure spool. The intermediate-pressure compressor 705 is driven by the intermediate-pressure turbine 709 via an interconnecting shaft 712, together forming an intermediate-pressure spool. The high-pressure compressor 706 is driven by the high-pressure turbine 708 via an interconnecting shaft 713, together forming a high-pressure spool.

In the present embodiment, the intermediate-pressure spool is designated the starting spool. The same approach for starting engine 101 may be taken with the engine 701, with the combination of permanent magnet alternator and electrical starter-generator together to drive the starting spool via the accessory gearbox 714 and tower shaft arrangement 715 during the engine start procedure.

In an alternative embodiment, the high-pressure spool is designated as the starting spool, and the accessory gearbox 714 and tower shaft arrangement 715 are connected therewith.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A gas turbine engine comprising:
   an electronic engine controller;
   one or more spools, one of which is designated a starting spool for starting the engine, and which has a required starting torque $\tau_s$;
   a permanent magnet alternator mechanically coupled with the starting spool, the alternator being configured to, in a motor mode, provide a peak torque of $\tau_a$, and, in a generator mode, generate electrical power for the electronic engine controller;
   an electrical starter-generator mechanically coupled with the starting spool, the starter-generator being configured to, in a motor mode, provide a peak torque of $\tau_{sg}$, and, in a generator mode, generate electrical power for an external load;
   wherein $\tau_{sg}+\tau_a \geq \tau_s$ and $\tau_{sg}$, $\tau_a < \tau_s$, and the electronic engine controller is configured to, during a start procedure, operate both the permanent magnet alternator and the starter-generator in a motor mode the respective motor modes to drive the starting spool.

2. The gas turbine engine of claim 1, in which the one or more spools comprises:
   a high-pressure spool having a high-pressure compressor driven by a high-pressure turbine; and
   a low-pressure spool having a low-pressure compressor driven by a low-pressure turbine.

3. The gas turbine engine of claim 2, in which the high-pressure spool is designated as the starting spool.

4. The gas turbine engine of claim 2, in which the low-pressure spool further comprises a fan driven by the low-pressure turbine.

5. The gas turbine engine of claim 4, in which the fan is driven by the low-pressure turbine via a reduction gearbox.

6. The gas turbine engine of claim 1, in which the one or more spools comprises:
   a high-pressure spool having a high-pressure compressor driven by a high-pressure turbine;
   an intermediate-pressure spool having an intermediate-pressure compressor driven by an intermediate-pressure turbine; and
   a low-pressure spool having a fan driven by a low-pressure turbine.

7. The gas turbine engine of claim 6, in which the high-pressure spool is designated as the starting spool.

8. The gas turbine engine of claim 6, in which the intermediate-pressure spool is designated as the starting spool.

9. The gas turbine engine of claim 1, in which the electrical starter-generator is one of:
   a wound-field synchronous electric machine;
   a permanent magnet synchronous electric machine.

10. The gas turbine engine of claim 1, in which the permanent magnet alternator comprises a plurality of stator winding sets.

11. The method of claim 1, in which the electrical starter-generator is one of:
   a wound-field synchronous electric machine;
   a permanent magnet synchronous electric machine.

12. A method of starting a gas turbine engine of the type comprising:
   one or more spools, one of which is designated a starting spool for starting the engine, and which has a required starting torque $\tau_s$;
   a permanent magnet alternator mechanically coupled with the starting spool, the alternator being configured to, in a motor mode, provide a peak torque of $\tau_a$, and, in a generator mode, generate electrical power for the electronic engine controller;
   an electrical starter-generator mechanically coupled with the starting spool, the starter-generator being configured to, in a motor mode, provide a peak torque of $\tau_{sg}$, and, in a generator mode, generate electrical power for an external load;
   wherein $\tau_{sg}+\tau_a \geq \tau_s$ and $\tau_{sg}$, $\tau_a < \tau_s$;

the method comprising operating both the permanent magnet alternator and the starter-generator in a motor mode the respective motor modes to drive the starting spool.

13. The method of claim 12, in which the one or more spools comprises:
   a high-pressure spool having a high-pressure compressor driven by a high-pressure turbine; and
   a low-pressure spool having a low-pressure compressor driven by a low-pressure turbine.

14. The method of claim 13, in which the high-pressure spool is designated as the starting spool.

15. The method of claim 13, in which the low-pressure spool further comprises a fan driven by the low-pressure turbine.

* * * * *